United States Patent
Craymer, III

(10) Patent No.: US 9,864,590 B2
(45) Date of Patent: *Jan. 9, 2018

(54) METHOD AND SYSTEM FOR AUTOMATED IMPROVEMENT OF PARALLELISM IN PROGRAM COMPILATION

(71) Applicant: Loring G. Craymer, III, Temple City, CA (US)

(72) Inventor: Loring G. Craymer, III, Temple City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/869,823

(22) Filed: Sep. 29, 2015

(65) Prior Publication Data

US 2016/0098258 A1    Apr. 7, 2016

Related U.S. Application Data

(63) Continuation of application No. 13/929,649, filed on Jun. 27, 2013, now Pat. No. 9,182,957.

(60) Provisional application No. 61/670,071, filed on Jul. 10, 2012.

(51) Int. Cl.
*G06F 9/45* (2006.01)

(52) U.S. Cl.
CPC .............. *G06F 8/452* (2013.01); *G06F 8/44* (2013.01); *G06F 8/443* (2013.01); *G06F 8/456* (2013.01)

(58) Field of Classification Search
CPC .......... G06F 9/4881; G06F 8/452; G06F 8/44; G06F 8/443; G06F 8/456
See application file for complete search history.

(56) References Cited

U.S. PATENT DOCUMENTS

| | | | |
|---|---|---|---|
| 5,920,723 A | 7/1999 | Peyton, Jr. et al. | |
| 5,966,539 A | 10/1999 | Srivastava | |
| 6,275,976 B1 | 8/2001 | Scandura | |
| 7,426,721 B1 | 9/2008 | Saulpaugh | |
| 2003/0140337 A1 | 7/2003 | Aubury | |
| 2004/0019883 A1* | 1/2004 | Banerjee | G06F 8/4434 717/152 |
| 2004/0237056 A1 | 11/2004 | Okada | |
| 2005/0188364 A1* | 8/2005 | Cockx | G06F 8/456 717/159 |

(Continued)

FOREIGN PATENT DOCUMENTS

CN    101216803 A    7/2008

OTHER PUBLICATIONS

PCT Notification of Transmittal of the International Search Report and the Written Opinion of the International Searching Authority, for PCT Counterpart Application No. PCT/US2013/049805, dated Oct. 18, 2013, 9 pages.

(Continued)

*Primary Examiner* — Camquy Truong
(74) *Attorney, Agent, or Firm* — NDWE, LLP

(57) ABSTRACT

A method of program compilation to improve parallelism during the linking of the program by a compiler. The method includes converting statements of the program to canonical form, constructing a traversable representation, such as an abstract syntax tree (AST), for each procedure in the program, and traversing the program to construct a graph by making each non-control flow statement and each control structure into at least one node of the graph.

22 Claims, 17 Drawing Sheets

(56) References Cited

U.S. PATENT DOCUMENTS

| | | | |
|---|---|---|---|
| 2005/0246700 A1* | 11/2005 | Archambault | G06F 8/4442 717/156 |
| 2007/0245325 A1 | 10/2007 | Lapounov et al. | |
| 2007/0245330 A1 | 10/2007 | Lapounov et al. | |
| 2009/0222799 A1 | 9/2009 | Stewart | |
| 2009/0307664 A1 | 12/2009 | Huuck et al. | |
| 2010/0325608 A1* | 12/2010 | Radigan | G06F 8/456 717/106 |
| 2012/0144376 A1 | 6/2012 | Van Eijndhoven et al. | |
| 2013/0191817 A1 | 7/2013 | Vorbach | |

OTHER PUBLICATIONS

PCT Notification Concerning Transmittal of International Preliminary Report on Patentability (Chapter I), for PCT Counterpart Application No. PCT/US2013/049805, dated Jan. 22, 2015, 6 pages.

Extended European Search Report and Opinion, for European Counterpart Application No. 13816485.0, dated Feb. 22, 2016, 12 pages.

Bacon, et al., "Compiler Transformations for High-Performance Computing," ACM Computing Surveys, vol. 26, No. 4, Dec. 1994, 76 pages.

Dennis, "First Version of a Data Flow Procedure Language," Programming Symposium, Springer Berlin Heidelberg, Apr. 9, 1974, pp. 362-376.

Zima, et al., "SUPERB: A tool for semi-automatic MIMD/SIMD parallelization," Parallel Computing 6 (1988), Elsevier Science Publishers, 1988, 18 pages.

Non Final Office Action from U.S. Appl. No. 13/929,649 dated Mar. 26, 2015, 30 pages.

Notice of Allowance from U.S. Appl. No. 13/929,649 dated Jul. 30, 2015, 17 pages.

Office Action from foreign counterpart China Patent Application No. 201380047127.2, dated Sep. 8, 2016, 16 pages.

Second Office Action from foreign counterpart China Patent Application No. 201380047127.2, dated Jun. 1, 2017, 14 pages.

* cited by examiner a.) if statement b.) for loop c.) shunt with set of control values

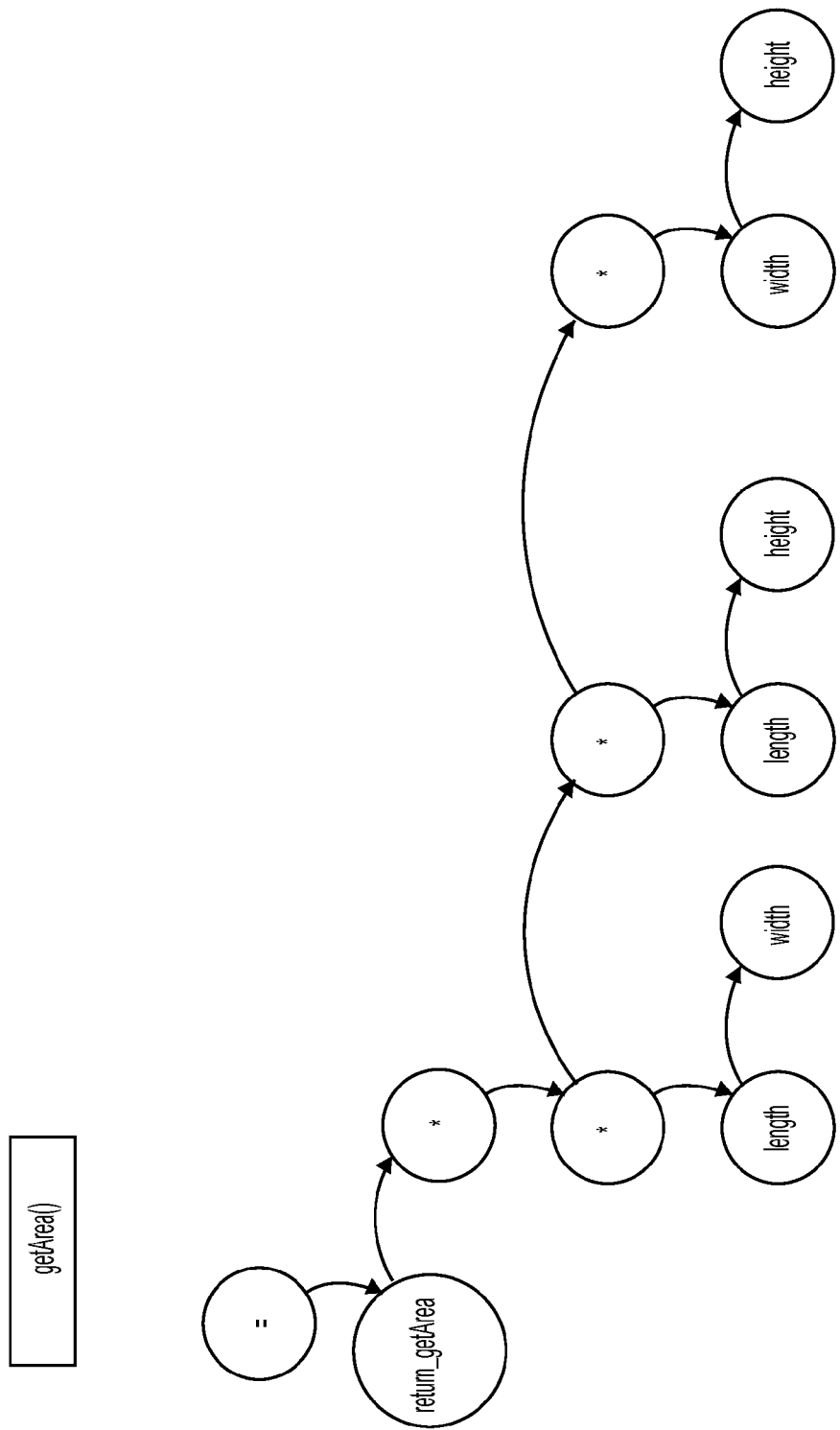

METHOD AND SYSTEM FOR AUTOMATED IMPROVEMENT OF PARALLELISM IN PROGRAM COMPILATION

CROSS-REFERENCE TO RELATED APPLICATIONS

This application is a continuation of U.S. patent application Ser. No. 13/929,649, filed Jun. 27, 2013 (now U.S. Pat. No. 9,182,957, issued Nov. 10, 2015), which claims priority to U.S. Provisional Patent Application No. 61/670,071, filed Jul. 10, 2012, both of which are hereby incorporated by reference.

FIELD OF THE INVENTION

The embodiments of the invention as illustrated and described herein are related to software compilation and a system and methods for improving parallelism generated in the link-time compilation process for object code generated during the compilation process.

BACKGROUND

Computer software creation is a mufti-stage process. Computer software is initially written as source code. The source code can be written in a computer language such as C, C++ or similar high level computer language. While these high level computer languages are generally comprehended by human programmers, computers are generally unable to execute programs written in such high level computer languages. The source code is converted into a computer executable language, sometimes referred to as an assembly language or processor instruction set. This conversion process is referred to as compilation, which is carried out by a computer program referred to as a "compiler."

In some computer systems, multiple-processors or similar parallel processing resources are available. The source code can be organized or marked by a programmer to be executed in parallel by the multiple-processors or processing resources. The programers can identify sections of the source code that are capable of parallel execution based on the relative independence in the operation of these source code sections. However, the identification of such parallelism by programers can be inexact and inconsistent. As a result, the compilation of the source code for execution on multiple-processors can be sub-optimal.

The use of multiple-processors, multi-core processors and similar devices continues to grow. This has become an important aspect of improving the processing power of computers and similar devices. Thus, improving identification of parallelism in the source code and the compilation of the source code to exploit the parallelism is crucial to the proper utilization of the expanding power of these processing devices.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 6C is a third diagram of the example program constructed as a whole-program graph.

DETAILED DESCRIPTION

Figure 1:
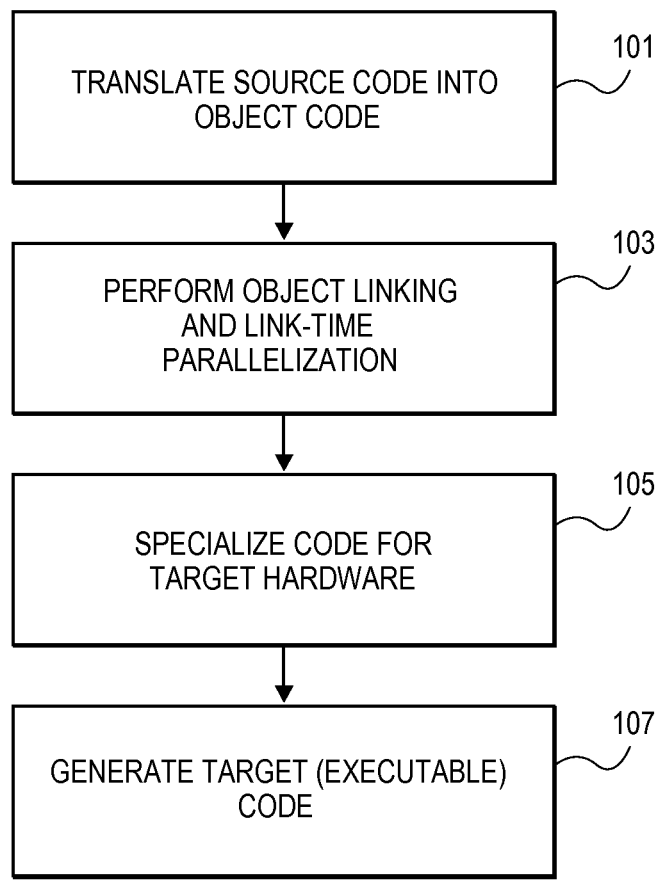
FIG. 1 is a flowchart of one embodiment of a compilation process.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations depicted in the flow diagrams in the attached Figures will be described with reference to the exemplary embodiments shown in the attached Figures. However, it should be understood that the operations depicted in the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory)

and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video).

The terms "function" and "procedure" are commonly used interchangeably in computer science and generally refer to a computer-implemented process defined in a computer program. In mathematics, a "function" acts on its arguments to produce a result and has no other effects on its environment. Herein, "function" is used in the mathematical sense, and "procedure" is used in the computer science sense.

FIG. 1 is a flowchart of one embodiment of a compilation process. The compilation process transforms source code into object code (Block 101). Source code can be a computer program or set of computer programs that are expressed in a computer programming language. The source code can be in any computer programming language such as C, C++, Fortran or similar computer language. The object code expresses the same computer program in another computing program language or similar computer program description methodology. In one example embodiment, the object code can be in an assembly language or similar low-level programing language and can be in an executable form. Object code can also encompass intermediate code formats with standardized representations and formatting for primary usage within the stages or modules of the compiler process. The compilation process can translate the source code into any state of object code.

The compilation process can perform object linking and link-time parallelization (Block 103). The process of identifying parallelism is described herein below with regard to FIGS. 2-6. The compilation process can also specialize the object code for a target hardware or platform (Block 105). The object code can be translated or transformed into target code, e.g., a language (e.g., assembly level instructions) for the target hardware or platform (Block 107). Any type of compilation process and any target language can be utilized. The compilation process can be directed toward a single platform or a set of related platforms with variations in the target executable for the various differences between the platforms.

Figure 2:
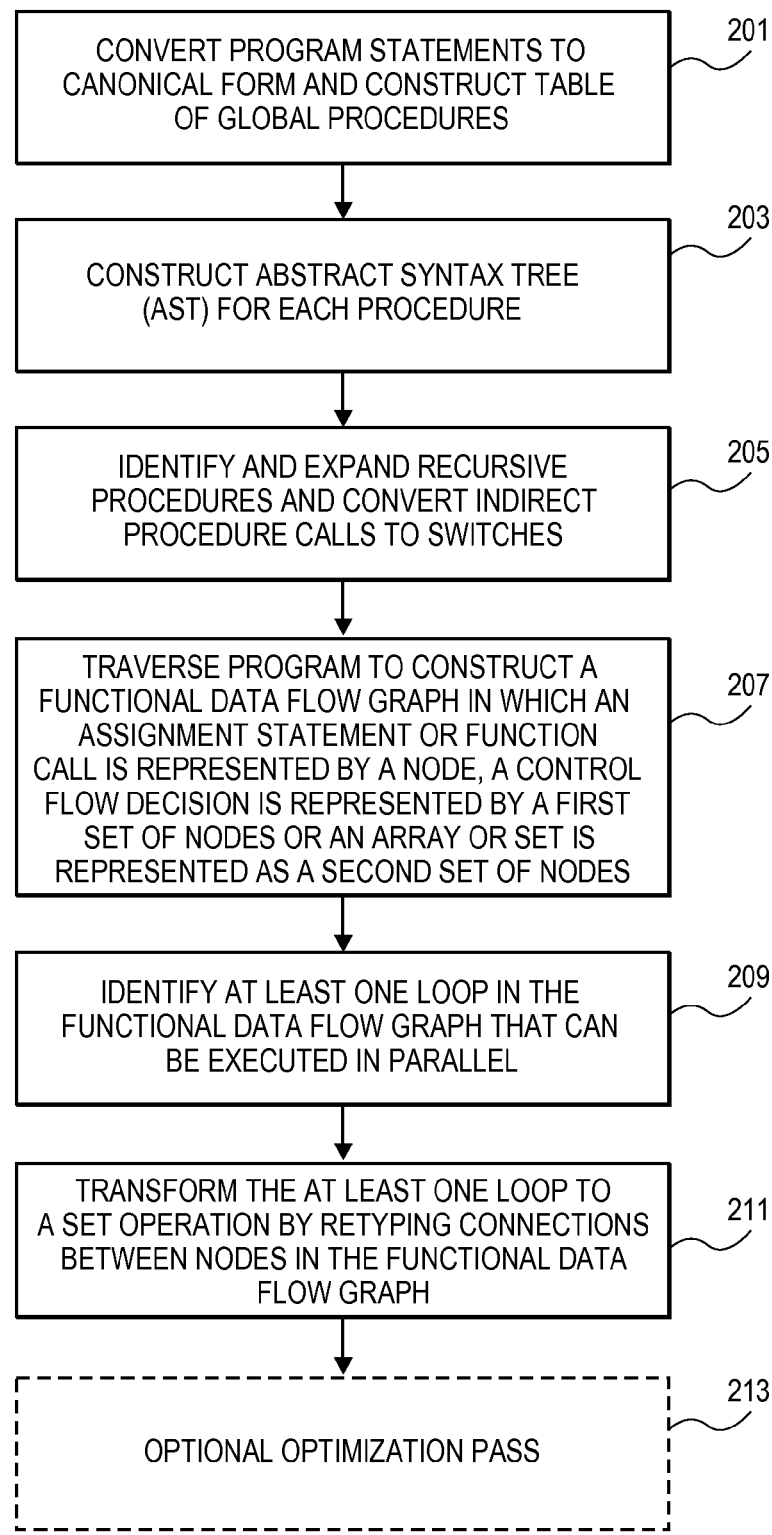
FIG. 2 is a flowchart of one embodiment of process for generating a functional dataflow graph.

FIG. 2 is a flowchart of one embodiment of process for generating a whole-program dependency graph. The whole-program dependency graph creation process converts a computer program into the whole-program dependency graph that exposes the parallelism in the computer program. The program statements in the computer program are converted into statements in a canonical format and a global table of the procedures in the computer program is constructed (Block 201). The canonical format prepares the program for conversion and can be any type of format or pseudo-code organization. The canonical format can remove syntax and similar aspects of the code of the program to prepare it for conversion. The global procedures table contains a name or similar identifier for each procedure along with a pointer or location information for the abstract syntax tree (AST) to be constructed for each procedure. This table can be utilized during the program traversal as described below.

These ASTs are constructed for each procedure in the code of the program (Block 203). Abstract syntax trees are tree (i.e., directed graphs having a root, branches and leaves) representations of the structure of computer programs or in this case the procedures of the program code. Each node (i.e., root, branch or leaf) in the tree represents a structure in the program code such as variables, operators, procedure calls and similar structures. In other embodiments, concrete syntax trees may be used in place of the ASTs.

Within the ASTs recursive procedures are identified. Recursive procedures are procedures that are directly (within its definition) or indirectly (within the definitions of referenced procedures) self-referential. Recursive procedures are identified and expanded or flattened (Block 205). Expanding or 'flattening' the procedures removes the recursive definition by reformulating the recursive definition of the procedure into an iterative or similar procedure. Similarly, indirect procedures calls are detected and converted to tables and switch nodes. Indirect procedure calls (also referred to as indirect function calls) are procedures that are not explicitly called in the code of the program. Rather, a pointer or similar reference to the procedure is utilized and this can also include the use of a variable to reference a procedure. Expanding or flattening these indirect procedures can involve placing the indirectly referenced function in-line (i.e., in the location where the reference occurs) or similarly constructing the AST to remove the indirection. The global procedure table is updated to connect each AST with the procedure name or similar identifier.

Once the procedures of the program are thus prepared, with each having a complete AST without recursion or indirection, the entirety of the whole-program dependency graph can be generated while walking the program starting with the first line of the main procedure, function, method or a similar starting location in the computer program. The program AST is traversed to construct a functional dataflow graph, where each non-control flow statement and each control structure is converted to a corresponding node as discussed further herein below (Block 207). Explicit procedures calls are expanded in-line in the code by use of the global procedures table that was previously prepared for reference. Each explicit procedure call is looked-up in the global procedure table to identify and retrieve the associated AST for insertion into the functional dataflow graph. Assignment statements or function calls are represented as nodes in the functional dataflow graph. Control flow decisions are represented by a set of nodes. Similarly, array or set operations are represented as sets of nodes. Arcs connecting nodes represent data items or sets. Thus, in the functional dataflow graph nodes represent computation while arcs represent data.

At this point, the functional dataflow graph represents all fine-grained task parallelism (computations involving independent input variables), but no data parallelism (cases where the same computations are performed for different data items). To extract data parallelism, the functional dataflow graph can be traversed to identify each loop in the graph that can be executed in parallel (Block 209). Each such loop is transformed to a set operation by converting arcs connecting nodes from representations of single items to representation of indexed collections of like data items in the functional dataflow graph (Block 211) and removing the loop logic.

Additional optimization and parallelism can then be sought in the resulting object code. Such optimizations can be specific to platforms and resources of those platforms (Block 2013). Functions can be composed (combined into single graph nodes) or decomposed (split into multiple nodes); loops can be split, with the loop logic replicated and independent calculations separated to form bodies of separate loops. Loop analysis can be carried out and conversion to set form can be carried out to extract as much (data) parallelism as possible. This use of sets can extract more parallelism than the target can support, in this case set-oriented operations are converted back to loop form while retaining some fixed degree of parallelism. This is an optimization step—for hardware conversion, the issue is replicated circuitry; for software, the issue is memory and network topology.

Figure 3:
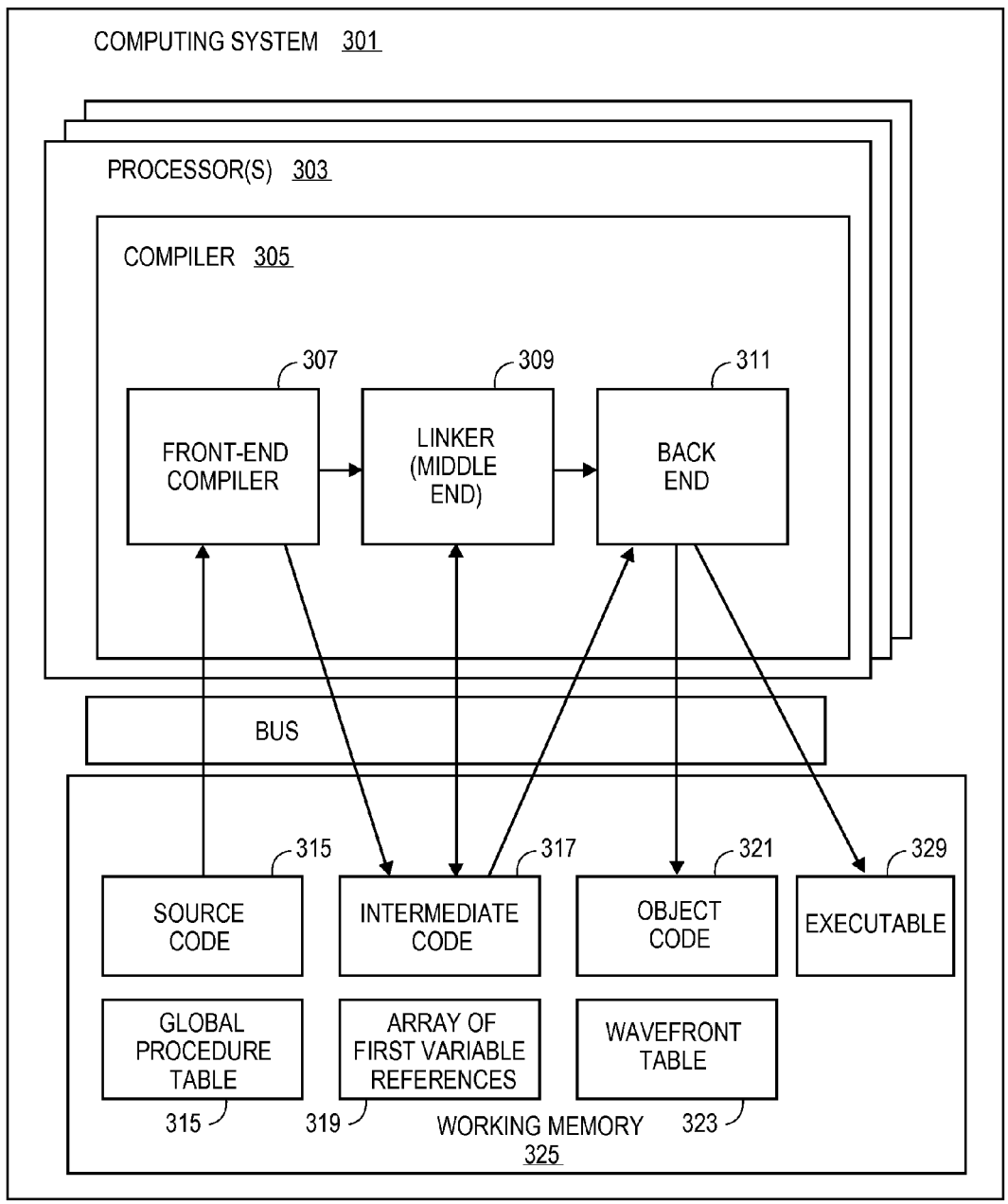
FIG. 3 is a diagram of one embodiment of a set of basic functional dataflow nodes.

FIG. 3 is a diagram of one embodiment of a computer system implementing the compilation process. The computer system 301 can include a processor or set of processors 303 to execute a compiler 305 implementing the compilation processes described herein. In another embodiment, the compiler 305 and associated processes can be executed in a distributed manner across multiple computer systems in communication with one another. For sake of clarity, an embodiment executed within a single computer system is described herein below. However, one skilled in the art would understand that the principles and structures described herein are consistent with other embodiments having other configurations such as distributed implementations.

In one embodiment, the compiler 305 includes a front-end compiler 307, middle-end compiler (linker) 309, and back-end compiler (code generator) 311, which divide the responsibilities of generating target object code. The front-end compiler 307 performs a set of checks on the source code 315 of the program to determine whether the program has correct programming language syntax and semantics. Improper syntax and semantics are reported and can cause the compilation process to end at this stage. The front-end compiler 307 can also perform type-checking that confirms that all data is properly handled by type in the source code 315 of the program. If the syntax, semantics and type are correct, then the front-end 307 then generates intermediate code 317 based on the source code for processing by the middle-end compiler 309. The intermediate code 317 is a representation of the program for internal use of the compilers that facilitates the conversion to the object code 321.

The middle-end compiler 309 reconstitutes the procedure ASTs from intermediate code 317, then carries out recursion removal, transformation to functional dependency graph, and set-oriented transformation to generate the functional dataflow form. The transformation to functional dependency graph automatically achieves a number of traditional architecture-independent optimizations, including: the removal of redundant, unused, and unreachable code; propagation of constant values; extraction of loop invariants; and similar optimizations. The middle-end compiler 309 can generate another intermediate code 317 for further processing by the back-end compiler 311, although the typical case is for the back-end compiler to be a second stage of the linker executable.

The middle-end compiler 309 is separate from the front-end compiler and may execute as a parallel process, especially for large programs. This is the stage in which the conversion to functional dataflow graphs takes place as described above in regard to FIG. 2. The middle-end compiler 309 reads in all object modules, collecting a global variable table, a global type table, and module-local variable tables (at most one per module), then it constructs the table of global procedures. A transformation of recursive functions to iterative form is made. Indirect function calls are converted to switch tables and indices are generated for the switches. Starting with the primary procedure or function of the program (e.g., "main" in C-like languages), a walk the AST is performed. Each procedure call is effectively expanded in-line during this process, and a whole-program dependency graph is thereby constructed. In some embodiments, a loop analysis may be carried out and set conversions may be performed to extract as much parallelism as possible. This use of sets may allow for more parallelism than the target can support, so it is normal to convert set-oriented operations back to loop form while retaining some fixed degree of parallelism. This is an optimization step—for hardware conversion, the issue is replicated circuitry; for software, the issue is memory and network topology.

In one embodiment, the back-end compiler 311 converts the intermediate code 317 into object code 321, a set of object files or similar code. The prepared intermediate code 317 is converted to another programming language that is executable or partially executable by a processor of a target platform. This process can involve instruction by instruction replacement and reorganization. The process can also include resource allocations such as register assignments and similar details. The back-end compiler also attempts to identify and implement a level of parallelization specific to the hardware of the target platform by attempting to assign code for execution on each of a set of processors or execution units. For translation to hardware, the back-end compiler can translate the specialized functional dataflow graph to a petri net form and follow asynchronous hardware design (GALS—globally asynchronous, locally synchronous) processes to complete the conversion.

In a further embodiment, for generating executable code, it is necessary to aggregate graph nodes (otherwise, task scheduling overhead becomes a problem), to determine a memory schedule (what memory is used when; this is not an issue for conventional approaches), and to optimize the graph-node-level code and mapping the graph structure to a runtime model. Thus, the back-end compiler can also convert the intermediate code 315 into an executable 329. The back-end compiler 311 links together object code 321 generated by the compiler to create the executable 329 that can run on the target platform. The back-end compiler 311 combines the individual object code 321 with library code and other object code similar code to enable platform specific operation and execution of the source code 315.

The middle-end compilation process can also utilize a global procedure table 327, an array of first variable references 319 and a wavefront table 323. The global procedure table 327 tracks previously processed procedures for subsequent use in the compilation process. The global procedure table 327 can have entries matching the names or identifiers of procedures with related object code, intermediate code, source code, as well as, ASTs for each procedure. The array of first variable references tracks 319 the initial value for each variable in the computer program. The wavefront table 323 tracks the most recent value of variables during the compilation process.

The processors 303 can communicate over a bus 313, chip-level or system area network, or similar communication system with a working memory 325 storing the source code 315, intermediate code 317, object code 321 and executable 329. The working memory 325 can be any type of storage device such as solid state random access memory. The working memory 325 can store any of the above-mentioned data structures (i.e., the global procedure table, array of first variable references 319, wavefront table 323, and similar data structures. In addition to storing compiled code, the working memory 325 and persistent storage devices (not shown) are responsible for storing the executable of the compilers and linker 327.

The working memory 325 can be in communication with the processors 303 over the bus 313. However, one skilled in the art would understand that the bus 313 does not strictly indicate that only a bus separates the processors 303 and the bus 313 can include intermediate hardware, firmware and software components that implement the communication between the processor 303 and the compiler 305. One skilled in the art would understand that the computer system 301 is provided by way of example and not limitation and that well-known structures and components of a computer system 309 have been omitted for sake of clarity.

Functional Dataflow Introduction

In the early '90's, Ferrante and Cytron introduced static single assignment (SSA) form. In SSA form, each variable is assigned only once; at every assignment of a variable in the source program, a new variant of that variable is introduced. References to variables in the source program are replaced with "φ" functions that select the preceding variant assignment. SSA form enables a number of whole-program optimizations. This affects the compiler toolchain where link-time optimization is now possible. SSA can be applied to automatic parallelization, but with equivocal results. The problem is that SSA form tracks dependencies rather than being a parallel decomposition: execution still follows a single logical control flow path. Functional dataflow provides a replacement for SSA form that directly supports the extraction of parallelism. In dataflow execution models, programs are defined as a combination of a graph that governs execution sequence and a collection of "actors" that execute pieces of the program. Every node in the graph is occupied by an actor; every edge that links vertices (also referred to as "arcs") carries data ("tokens"). Individual nodes "fire" when all of their input arcs carry tokens; after firing has completed, tokens are placed on the output arcs. The functional dataflow form (defined herein) is a program representation in which actors are functions with zero or more inputs and a single output except for actors that manage control flow: these are treated as special node types. Additionally, arcs may represent sets (collections of unnamed items), and there are special node types to handle subset selection and to replace elements in a set or to aggregate elements into a set.

It should be noted that the specific dataflow form set forth herein is provided by way of example rather than limitation. One skilled in the art would understand that alternate representations can be utilized consistent with the principles and structures described herein. Any dataflow form can be utilized that explicitly represents sets and control flow to enable optimization processes.

As with SSA form, the optimizations enabled by functional dataflow models occur primarily at link time or in the middle-end compiler, and that the middle-end compiler (i.e., a linker) can be a parallel program. In this process, there are no constraints on program transformation other than equivalence of program outputs between executions of the parallelized program and its equivalent sequential version.

The Functional Dataflow Model

Figure 4:
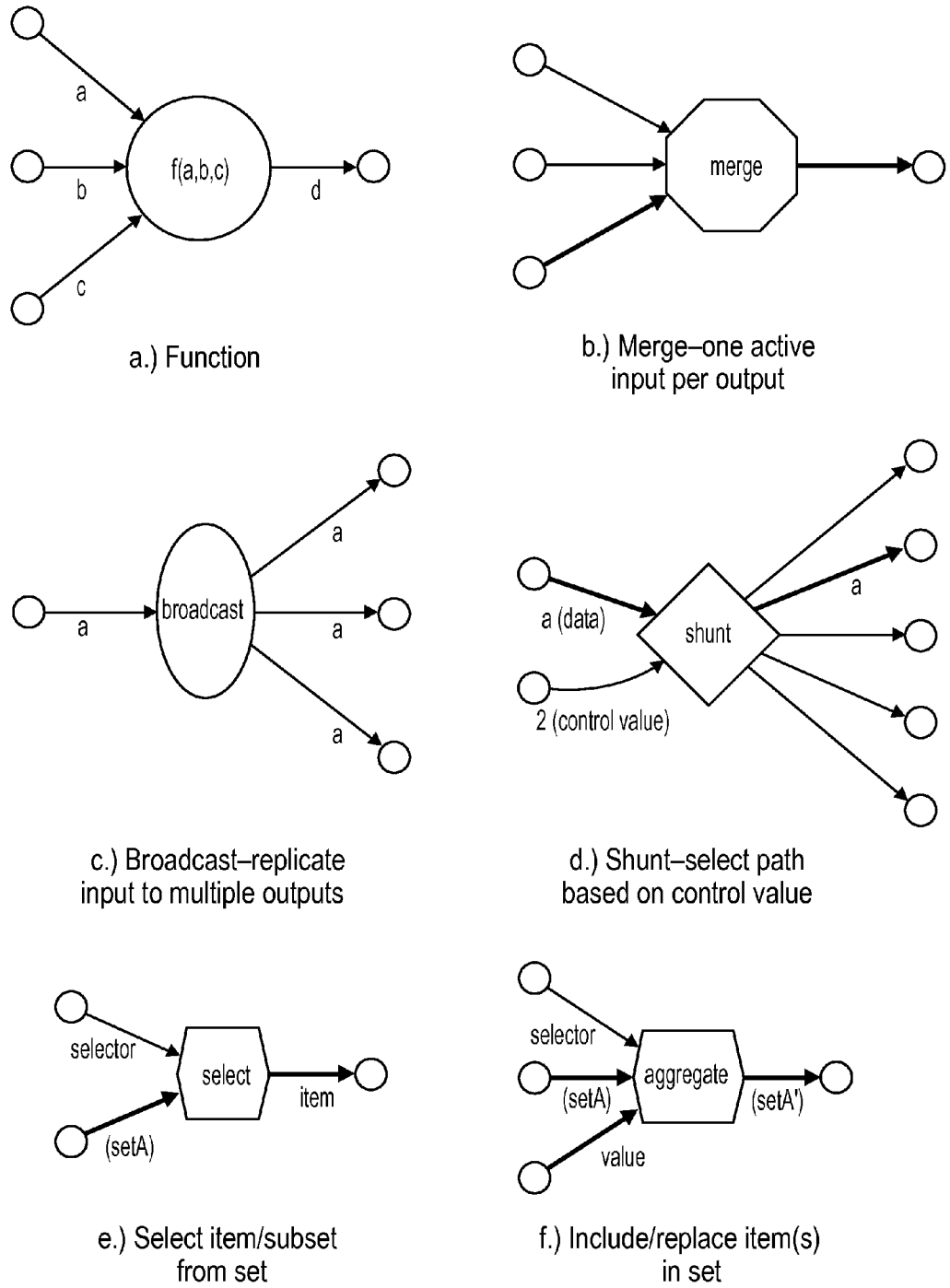
FIG. 4 is a diagram of one embodiment of a set of example control flow structures.

This process starts with generating a dependency graph; while the graphs for modules are generated by separate invocations of the compiler, these are stitched together at link time to form a whole-program dependency graph. Assignment statements become nodes in the graph, with each node representing a calculation, control flow, or set manipulation. FIG. 4 is a diagram of one embodiment of a set of basic functional dataflow nodes. These basic nodes include function nodes, merge nodes, broadcast nodes, shunt nodes, select nodes and aggregate nodes. Nodes are connected by arcs representing data items.

A "function" node (a) converts a set of inputs into a single (or null) output. A "merge" node (b) accepts an input from multiple possible sources and outputs that input value; this is the equivalent of a Φ-function in SSA form and represents a reference to a value that may be set in multiple places. A "broadcast" node (c) takes a single input and outputs that input to multiple destinations. Broadcast nodes may also represent data storage elements; a broadcast node with a single output is guaranteed to be a "storage" node that can be referenced multiple times. A normal behavior for references inside of loops. A "shunt" node (d) evaluates a control input to select one of several output arcs to route input data to; this is the usual way to handle conditional statements. Shunt nodes handle all control flow operations. A "select" node (e) selects an item or subset from a set (aggregate data type). A simple example is to select an element from an array; in this case A[j] is the jth (j being the selector) element in the array A. An "update" node (f) to update element values in a set or add to the set. A simple example is A[j]=value, but dynamic set operations are also possible.

The "function" nodes represent normal calculation of values in a program, the "merge" nodes represent references to a variable whose latest assignment could have happened at multiple places in a program (consider an if . . . a=x . . . else . . . a=y . . . then statement; a might be either x or y, depending on which alternative was taken). The "broadcast" nodes complement the "merge": they represent single assignments that are referenced at multiple points in a program.

Arrays are a common feature of programming languages, and are a way to bundle like items without having to name each variable. This a convenient way of abstracting large data sets, but awkward for dependency graphs. The functional dataflow model incorporates basic set operations as item/subset selection or item/subset replacement or inclusion. All sets are indexed—there has to be some way of extracting a single item from a set for processing, followed by selecting the next item; this imposes an index ordering. Multi-dimensional arrays are treated as arrays of arrays: A[i][j] is the jth entry in the A[i] [.] set. This makes it possible to reason about data sets, including determining which set operations can be executed in parallel and which must be executed in an ordered sequence.

Set operations deal with parallelism so that $$f(\{a,b,\ldots\}) = \{f(a), f(b), \ldots\}$$

for functions of a single variable and $$f(\{a_i\}, \{b_i\}, \{c_i\}, \ldots) = \{f(a_i, b_i, c_i, \ldots)\}$$

for functions of multiple variables. Extension of the control nodes to sets are straightforward; broadcast and merge differ only in having set-oriented values, while shunts with sets of control values are equivalent to the set of shunts for the individual control values. Likewise, the set-oriented select and aggregate nodes can have set-oriented control values. In extending to set operation, arcs may represent sets and not just single item data. For mainstream programming languages, sets are derived: there are no sets in the initial transformation to functional dataflow form, but are derived in subsequent graph rewrites.

Figure 5:
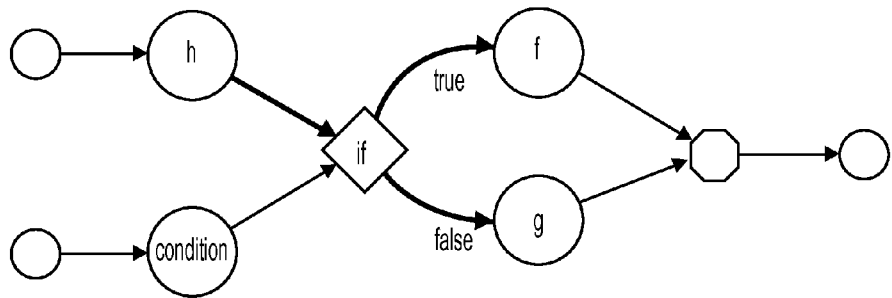
FIG. 5 is a diagram of one embodiment of a set of example control flow structures.
Figure 5:
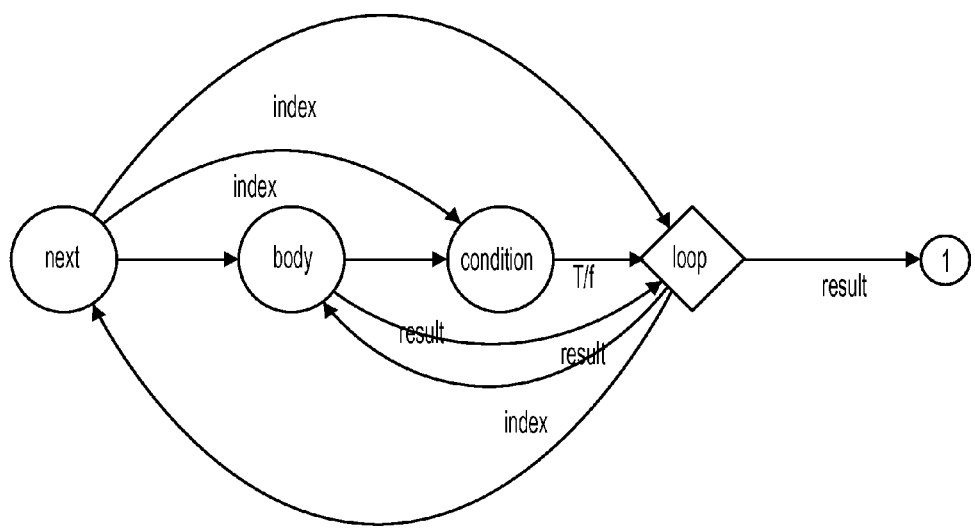
Figure 5:
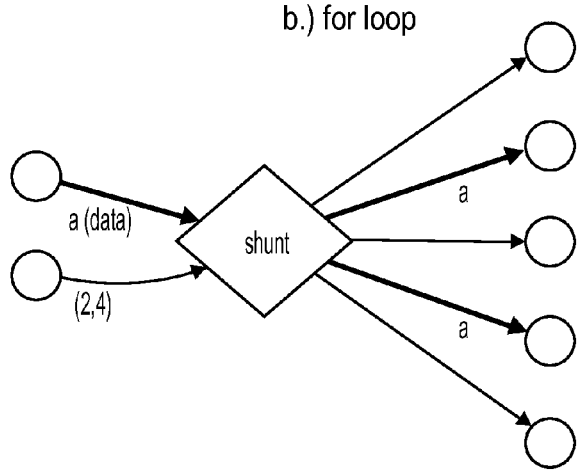

FIG. 5 is a diagram of one embodiment of a set of example control flow structures. The control flow structures include an If-Then statement, a For Loop and a Shunt. The shunt node is used to implement familiar control flow constructs, in this case "if . . . else . . ." and a "for" loop; the "C" switch statement is another common example. The transformation of a control structure to shunt form is not necessarily one-to-one; often, it is one-to-many with one shunt per variable assigned. The example (a) in FIG. 5 is fairly straightforward: depending on the control value, the input data is shunted either to the "true" output or the "false" output; the result of the f or g computation is then input to the following function node.

The example (b) of FIG. 5 is more complex: it represents a for (init( ); condition( ); next( )) loop, although the init( ) is omitted to simplify the graph (the index arcs would have two origins, init( ) and next( ), merged). The complexity arises from the mix of control and data calculations. The example (c) of FIG. 5 shows the effect of having a set of control values; multiple shunt outputs are activated.

Functional dataflow has fairly simple rewrites. Successive function nodes can be composed; functions can be moved across control nodes (data paths). Set rewrites can be used to extract loop parallelism; these features are discussed further herein below.

Functional Dataflow Graph Construction

The following is an example detailed embodiment of the process described above in regard to FIG. 5. The first step is to convert statements in the program to canonical form. Specifically, 1. For each assignment statement in the program of the form, value=expression, the following is performed:
    a. replace function calls in the assignment statement, e.g., f(x), with uniquely named temporary variables; as an example, assume that tTemp could be such a temporary variable.
    b. Precede the assignment statement with the statement tTemp=f(x); likewise for all other introduced temporaries. Excepting control flow specification, all statements in the program are now in one of the following forms
       a=expression(b, . . . )
       a=f( . . . ) a is assigned the results of a call to f( )
       f( . . . ) procedure call
2. Construct an abstract syntax tree (AST), or equivalent representation, for each procedure/function specified in the program source code and build a global procedure table relating procedure name to its AST. This construction may be done while applying the step 1 rewrites, i.e., in parallel with step 1.
3. During construction, track all indirect function (called through pointers) assignments; for each indirect function, construct the equivalent direct function in the form of a "switch" statement with unique indices corresponding to each function assignment. Replace the indirect function variable with an index variable, number the functions assigned to the indirect function, and replace assignment statements with index assignments.

Once the global procedure table is constructed, the individual procedure ASTs are processed to identify recursive procedures. For each procedure walk, two stacks are maintained: one records the state of an AST walk (preorder traversal), while the other contains the names of procedures in the "call" tree. For recursive procedures, a set of names of procedures—the name set—that invoke (directly or indirectly) the global procedure table entry. For each global procedure table entry not already labeled as being recursive:

1. Push the procedure name onto the call stack.
2. As procedure nodes are encountered, check to see if (a) the node is a recursive call to the global procedure table entry, and if so, label the table entry as recursive and add the contents of the name stack to the set; (b) the procedure has been labeled as recursive; if so, continue the walk; (c) if the node is present in the name stack, label the corresponding global procedure table entry as recursive and continue the walk. Otherwise: if the node is not a procedure node, continue the walk; if it a procedure node, push the state of the current AST walk onto the state stack. Push the name of the encountered procedure name onto the call stack; find the procedure AST in the table, and begin walking the procedure AST.
3. On completion of an AST walk, pop the top of the call stack, pop the top of the state stack, and resume processing of the calling tree from the item popped from the state stack.

Once all nodes have been labeled, a rewrite of the recursive procedures is performed to remove recursion. As before, two stacks are maintained 1. Walk the tree, copying nodes until a recursive procedure node is encountered.
2. When a recursive node is encountered (referenced to other than the global procedure table entry), check if the global procedure table entry is in the name set for the encountered procedure; if so, save state, insert a label for the encountered procedure and begin walking the AST for the encountered node. If not, copy the node and continue.
3. For a reference to the global procedure table or an element of the call stack:
    a. Create a unique numerical identifier; add the equivalent of "add identifier to stack; go to the relevant label" to the AST
    b. Continue, adding nodes to a new "continuation" AST associated with the identifier. If inside a forward conditional, the alternative is not copied; if inside a loop, rewrite the loop appropriately (partially unrolled, with nested loops—the "before" loop, the recursive procedure call, and the "after" loop).
    c. On return to the global procedure table entry, continue adding to the identified tree to the end of the current alternative (end of tree if not in a forward conditional); the next alternative is added to the new table entry AST, then nodes are added to both the identified tree(s) and the new table entry AST.

d. After the table entry procedure walk has completed, process the identified continuation ASTs; this will add a trailer of the form

```
for (; stack has entries; i=stack.pop( )) {
    switch (i) {
        case 1:
            continuation1
            break;
        case 2:
            continuation2
            break;
        ...
    }
}
```

4. Continue until all recursive entries in the table have been rewritten; replace the old ASTs with the rewritten versions.

The next step is to build the whole-program graph, using the procedure ASTs as templates. The rewrite of recursive procedures can be deferred to graph construction, but the above process may be more efficient.

The process for creating the whole program graph is described in relation to an example implementations herein below. One skilled in the art would understand that the principles and structures described can be applied to other implementations. Every non-control flow statement becomes a node in the graph. Two tables are maintained during graph construction; one contains arrays of first references for each variable (local variables are tracked when they are in scope and forgotten when they go out of scope; this table is the "reference" table), and one contains arrays of latest assignments (the wavefront table). As each assignment is processed, the assigned variable is added to the wavefront table (which may replace a previous assignment), and referenced variables are either linked to a previous occurrence in the wavefront table, or are noted in the reference table. As procedure nodes are encountered, procedures are expanded inline.

Control flow complicates the construction process and adds multiple versions of the wavefront table. On entry to a control structure, the wavefront table is replicated. For a multi-alternative construct, on completion of the first alternative, the active wavefront is saved, and the next alternative is processed, using another copy of the entry wavefront table; on completion of that alternative, the active wavefront table is merged (inserting merge nodes, as needed) with the saved wavefront table. Alternatives can be processed in parallel; the critical concern is to maintain the partial ordering that reflects normal execution. Succeeding alternatives are processed in the same fashion; after the last alternative is processed, the entry table and the merged table are used for insertion of shunt nodes. Loops are handled similarly; after processing the loop, the entry table and the active wavefront table are used to insert shunt nodes linking the end of the loop to the start of the loop for each element in the table. GOTO statements and their corresponding labels are handled with the aid of a map associating labels with saved wavefronts; exception syntax is handled similarly, but using a stack to track context. In another embodiment, an empty wavefront table is introduced at decision points instead of copying the current table, and links corresponding to table entries as part of the merge operation. When a variable is referenced in a nested wavefront table prior to any assignments to that variable, a merge node is inserted into the table as a placeholder for the initializing assignment.

Graph construction starts with the program entry procedure (e.g., a primary procedure such as "main( )" for C/C++ and related languages), the graph for that procedure is constructed, including the reference and wavefront tables. Call and state stacks are maintained. As procedure references are encountered, walks are nested as described for the recursion identification step. At the end of this process, all references have been resolved, and the result is a functional dependency graph that exposes the functional parallelism in the application.

Indexed Sets and Array Parallelism

The above process effectively extracts all functional parallelism—parallelism not associated with loops—but no data parallelism (loop and array parallelism). To extract data parallelism, it is necessary to convert loops to parallel operations on indexed sets. Indexed sets are common in programming languages. An indexed set is a set of elements from each element can be referenced by a unique index value. In common programming languages, A[3] is the element in the array A associated with index value 3. Other types of indexed sets occur in programming languages, including associative arrays or hash tables (each element in an associative array is associated with an accessor value). Indeed, even 'unindexed' sets are typically indexed; the index is merely hidden from view and only becomes apparent in iterating through the set when it is possible to access the "first" element in a set, followed by the "second" element and so on.

Looping over an array is equivalent to repeatedly performing the same set of operations using a unique index for each iteration. The loop specification orders the iteration indices: consider the C construct for(int $i=0;i<n;i++$)

$a[i]=6$;

This loop assigns the $0^{th}$ element in a the value 6, then the first element, and so forth. Given the operation performed—assigning the value of 6 to each element—there is no reason that these operations be done in any particular order; the assignments could easily be carried out in parallel. Other loops can be replaced with a parallel equivalent provided that assignments are not done in place. Consider the loop for(int $i=0;i<n;i++$)

$a[i]=a[i]+a[(i+1)\% n]$;

This loop can be parallelized, but cannot be done in place; that is, it is necessary to transform array a to array b as in $b$=malloc(sizeof($a$));

for(int $i=0;i<n;i++$)

$b[i]=a[i]+a[(i+1)\% n]$;

$a=b$;

If the loop were instead for(int $i=0;i<n;i++$)

$a[i]=a[i]+a[(i+n-1)\% n]$;

then it could not be parallelized: each iteration depends on the result of the previous.

On the other hand, the loop for(int $i=2;i<n;i++$)

$a[i]=a[i]+a[i-2]$;

can be parallelized at least partially into computation on odd and even elements for (int i=2; i<n; i+=2)

a[i]=a[i]+a[i−2];

is executed in parallel with for(int i=3;i<n;i+=2)

a[i]=a[i]+a[i−2];

These examples cover the range of possibilities: if the loop operates on a single indexed value in each iteration, then it can be parallelized in place. If the loop operates on multiple indexed values, none of which precede the assigned elements, then the loop can be parallelized but not in place. Other loops may be partially parallelized if the iteration dependencies break the index set into subsets (odd and even indices in the last example); these are the loops for which polyhedral methods are appropriate. Arrays are not the only form of set that can be expressed in programs. Sets may occur as linked lists, binary trees, and other complex data structures. Provided that navigation operations can be identified inside loops, it is possible to distinguish sets and index order for such data structures. This can be difficult in the general case, but modern languages like C++ and Java have collection classes and canonical navigation methods that simplify the analysis. Functional dataflow makes it possible to change set representation as an optimization: Arrays can be distributed across processing nodes in a parallel machine, binary trees can be represented as heaps (a heap is an array representation of a binary tree; A[i] has children A[2i] and A[2i+1]) and distributed across processing nodes, and graphs can be represented as linked structures or as collections of nodes and edges (various representations).

In one embodiment the algorithm for determining whether the ordering specified in a loop is required or whether the loop can be executed in parallel is straightforward:
1. During construction of the functional dependency graph, collect the index values for all array accesses in the loop, distinguishing referenced values from assigned values; also, collect addresses/references of all array assignment nodes in the graph.
2. If there are only assignments for one array, skip to 4.
3. For each assignment node, determine array dependencies via pre-order, depth-first, graph traversal backwards from the node to the start of the loop. For each array referenced in the loop, accumulate a list of array dependencies from the result of the pre-order walks. Expand the dependencies for each array: if A depends on B and C, and B depends on D while C depends only on C, then the dependency list for A is {B, C, D}. Determine disjoint sets of array dependencies; process each separately.
4. For each array in a dependency set, compare the maximum reference index to the minimum assignment index (assuming the loop processes index values in increasing order; reverse this for decreasing order). If all arrays have reference indices that are less than or equal to their assignment indices, the loop can be processed in an unordered (parallel) fashion.
5. If the loop is unordered, rewrite the loop as a series of set operations. If there is only one index value, sets are overwritten; else new sets are created and written to. Go to 4; process the next dependency set.

As mentioned above, this does not extract all parallelism from loops; polyhedral methods can be applied in the remaining cases. The "space" dimension of the polytope model is also captured in the set model used here. This algorithm is presented by way of example rather than limitation. Other processes for determining whether the ordering specified in the loop is required can be utilized consistent with the principles and structures of the invention.

More generally, analysis is done by collecting information during a depth-first pre-order traversal of the dataflow graph; the dataflow graph may be rewritten during such a walk. Typical rewrites include: 1.) applying the distributive law to loop bodies to transform a loop with multiple paths into multiple loops prior to conversion to set form, 2.) the transformation to set form, and 3.) merging nodes and groups of nodes (successive set operations, for example, or combining arithmetic operations in ways that lead to more optimal code generation).

Synchronization and Collective Operations

It may be noted that there is an implicit synchronization after each set transformation, and that the familiar "collective" operations are set operations that return a scalar value. There are restrictions on what constitutes a collective operation: the binary operation that combines the results of set element calculations must be both associative and commutative. Because scalar variables may be used to accumulate values across iterations of a loop, the above process must be modified to include scalar variables that have array dependencies. Also, any assignments nodes that depend on the assigned variable will need to be rewritten: a=a op expression becomes $b$=expression;

temp=$a$ op $b$;

for the first occurrence, and subsequent dependencies on a are replaced with dependencies on a and b; subsequent assignments to a that depend on a are converted to updates of b and re-evaluation of temp. At the end of the loop, a is assigned a value of a=a op b. Should op not be both commutative and associative, or should different operations be used, then computation of a is order-dependent.

Compound Data Types

Compound data types, datatypes composed from atomic types, are a special case. They are treated as atomic only for creation: assignments of compound data types are treated as "gang" assignments of the individual field variables. If a and b are instances of a compound datatype with fields x, y, z, then a=b is treated as a.x=b.x, a.y=b.y, a.z=b.z. While fields in a compound data type may represent sets, compound datatypes do not.

This approach makes it possible to optimize away some fields in a compound datatype: in languages supporting classes, it is not uncommon to use some fields in a class for transient computations; object-oriented programming styles can propagate this approach to languages—C and FORTRAN—that lack direct class support.

EXAMPLES

The following examples demonstrate the conversion of specific programs to whole-program dependency graphs that extract the parallelism in the programs. The features demonstrated in these examples include: task/marker parallelism; recursion. loop to set conversion, procedure expansion, simple if/else statement.

Example 1: Surface and Volume Computation
(Java-Like Code)

```
int length = 5;
int width = 7;
int height = 3;
main( ) {
int volume = getVolume( );
int area = getArea;
System.out.println("Volume = " + volume + "; area = " + area);
}
int getVolume( ) {
return length * width * height;
}
int getArea( ) {
return 2 * (length * width + length * height + width * height);
}
```

FIGS. 6A-6E are diagrams illustrating the conversion of the above program to a whole-program dependency graph. The first step is to parse and construct ASTs for each procedure (i.e., main( ), getVolume( ) and getArea( )), as well as building a table of initial values for global variables. In this case, the initial value table is set forth below and determined from the set of declared variables and their values at the beginning of the program.

TABLE I

| Variable | Initial value |
|---|---|
| length | 5 |
| width | 7 |
| height | 3 |

Figure 6A:
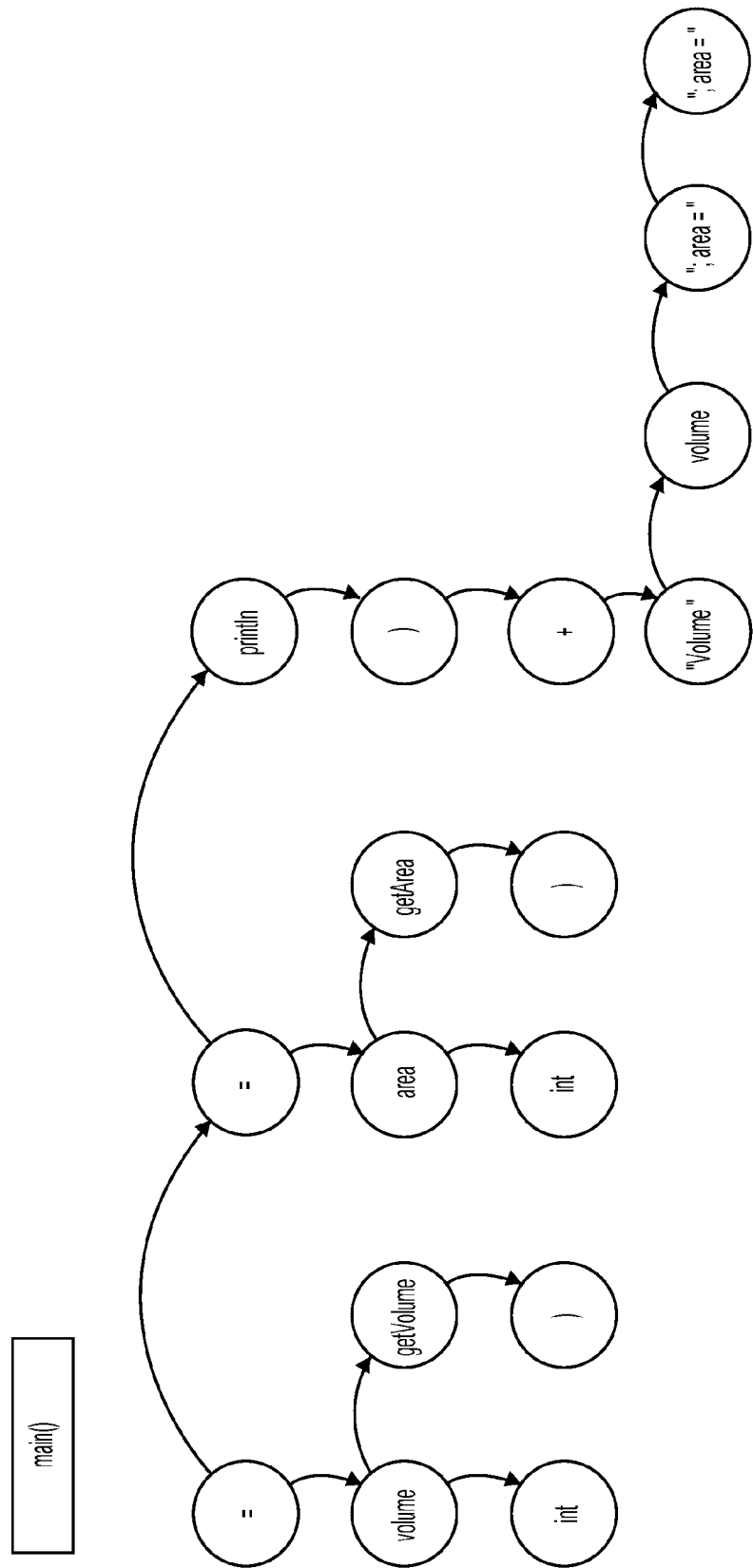
FIG. 6A is a diagram of an example program constructed as a whole-program graph.
Figure 6B:
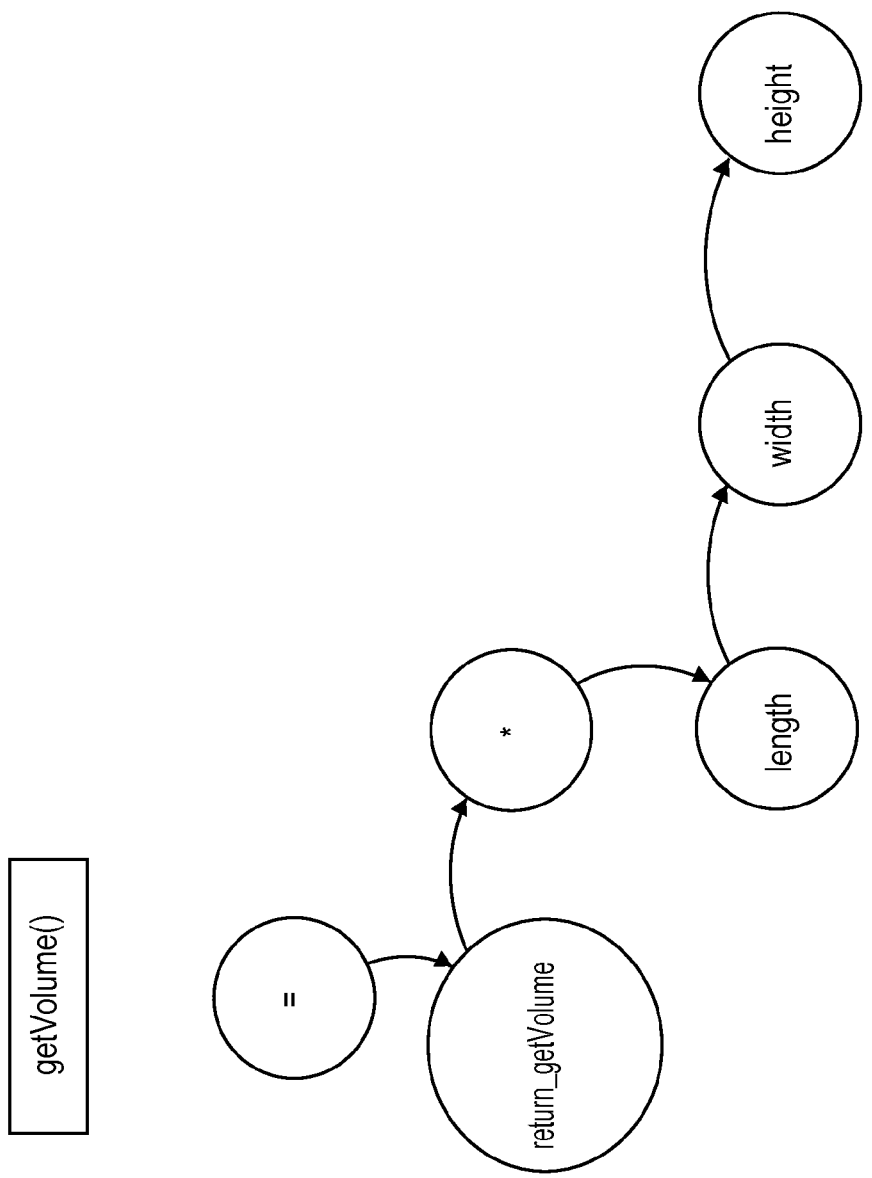
FIG. 6B is a second diagram of the example program constructed as a whole-program graph.
Figure 6D:
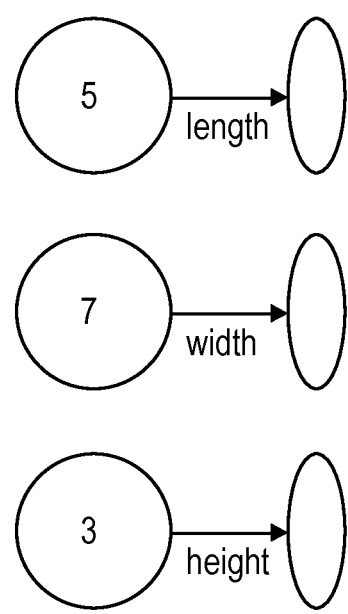
FIG. 6D is a fourth diagram of the example program constructed as a whole-program graph.
Figure 6E:
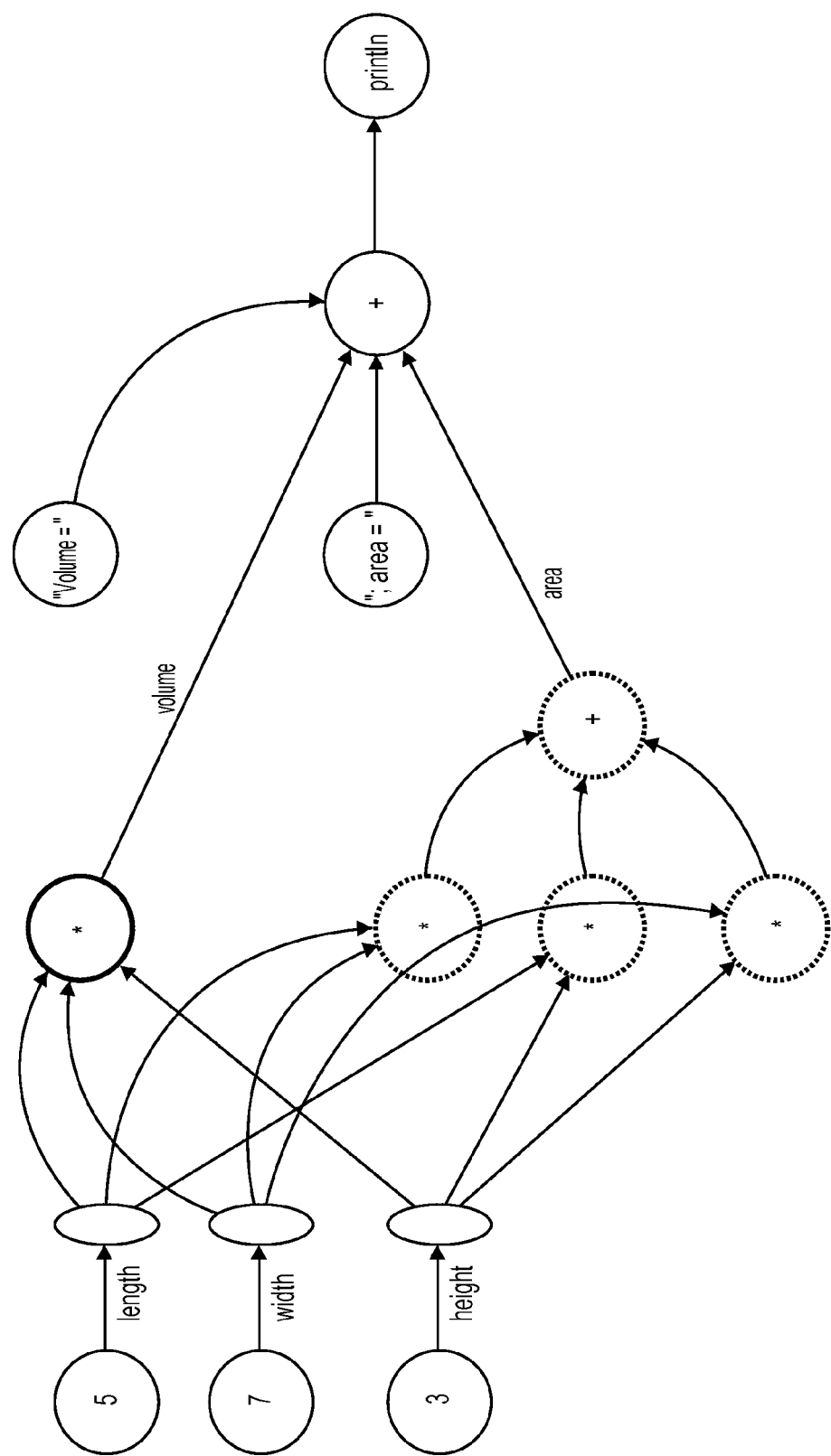
FIG. 6E is a fifth diagram of the example program constructed as a whole-program graph.

FIGS. 6A-6C are diagrams of the ASTs for each of the procedures, main( ), getVolume( ), and getArea( ) for a surface and volume computation program. Each AST represents a full abstracted tree representation of the respective procedure. FIG. 6D is a diagram of the representation of the initial variables and their values for the whole program. These nodes represent the inputs into the graph to be constructed. After walking or traversing main( ) to inline getVolume( ) and getArea( ), FIG. 6E is a representation of the whole program, where getVolume( ) and getArea( ) are represented by sets of function nodes, as shown in FIG. 4. In FIG. 6E, these function nodes are shown on the left taking the initial values as inputs and outputting the respective volume and area results to the function node representing the rest of the AST of the main( ) procedure, which culminates with the output of the value on the right side of the graph via the println statement.

Example 2: Fibonacci Numbers (Recursion)

```
void fibonacci(int n) {
if ((n == 0) || (n == 1))
return 1;
return fibonacci(n-1) + fibonacci(n-2);
}
```

Figure 7A:
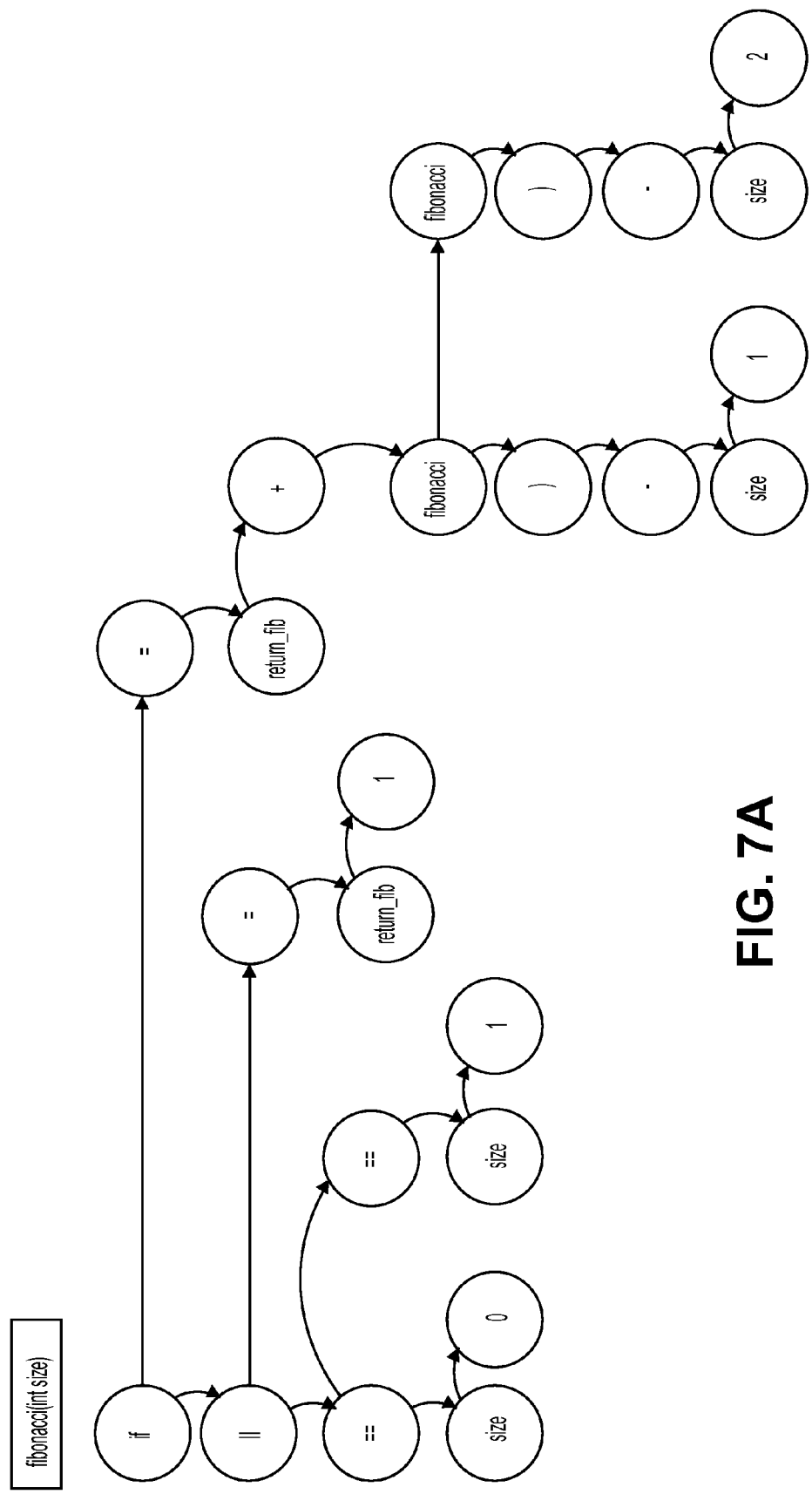
FIG. 7A is a diagram of an example program constructed as a whole-program graph.
Figure 7B:
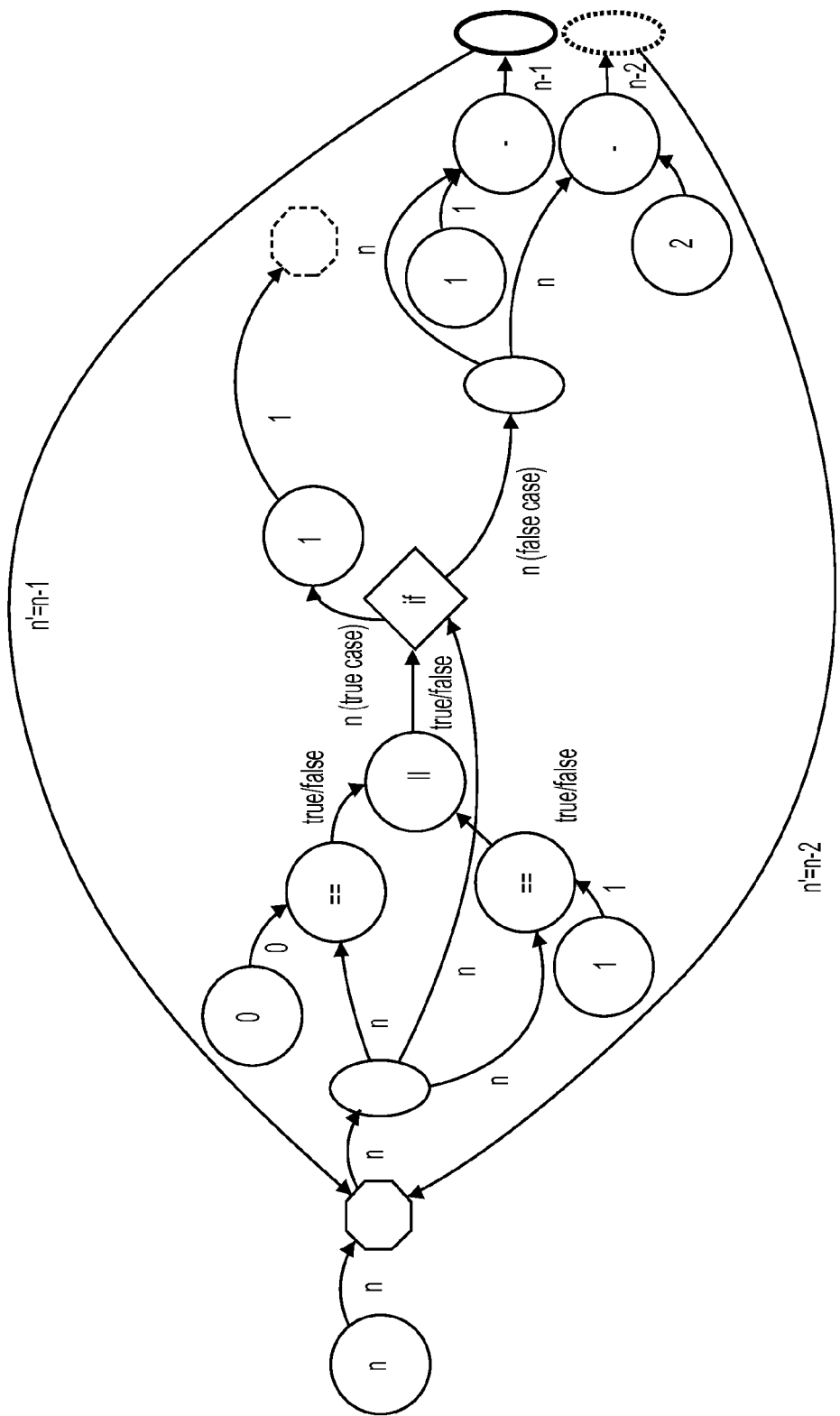
FIG. 7B is a second diagram of the example program constructed as a whole-program graph.
Figure 7C:
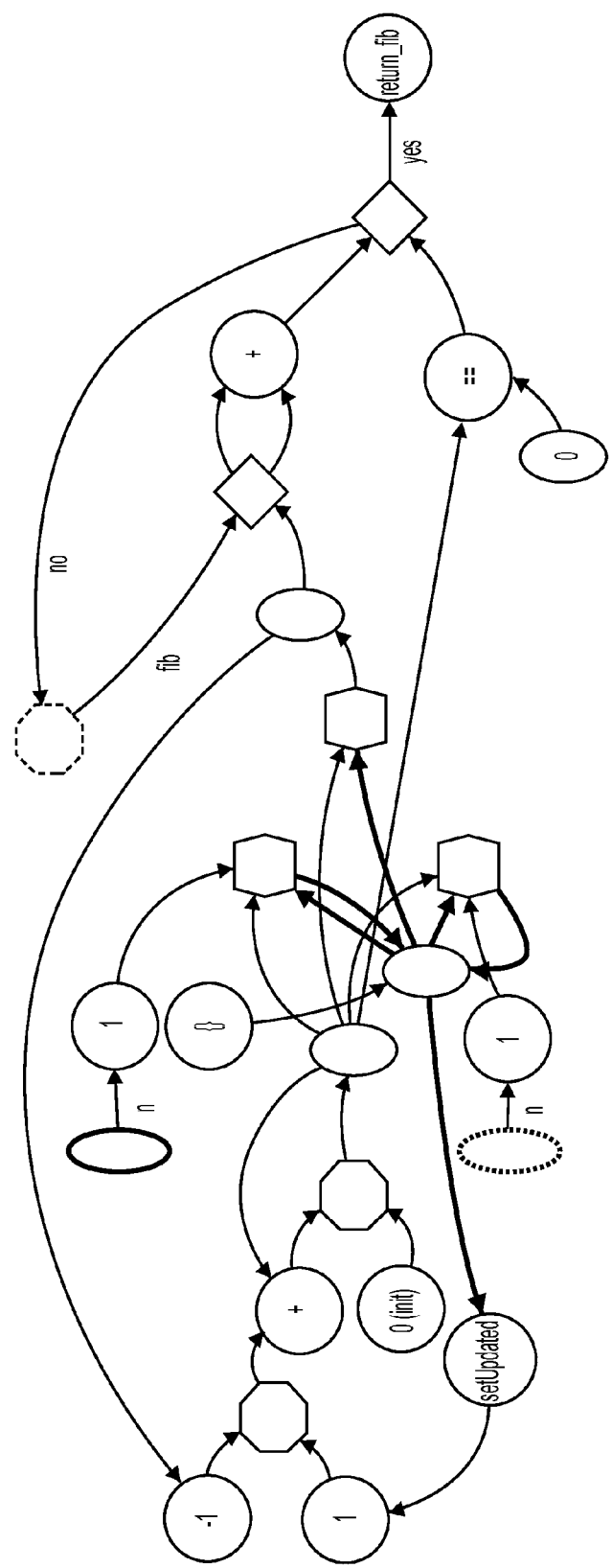
FIG. 7C is a third diagram of the example program constructed as a whole-program graph.

FIGS. 7A-7C are diagrams illustrating the conversion of the above program to a whole-program dependency graph. The first step is to parse and construct ASTs for sole procedure Fibonacci( ). In this example, there are no initial values or global variables. FIG. 7A is a diagram of the AST for the procedures, fibonacci( ) a well known algorithm. This AST represents a full abstracted tree representation of the respective procedure. After walking or traversing fibonacci( ), FIGS. 7B and 7C are a representation of the whole program, where the full graph is created by superimposing the differently colored nodes from the subgraphs. In FIGS. 7B and 7C, the AST is shown converted using the modules of FIG. 4 to represent the whole-program graph with recursion flattened.

Example 3: Matrix-Vector Multiply

```
int[ ][ ] matrix = { { 1, 2 },
                    { 3, 4 },
                    { 5, 6 }
                   };
int[ ] vector = { 7, 8 };
int[ ] transform(int[ ][ ] m, int[ ] v) {
int[ ] result = new int[3];
for (int i=0; i<3; i++) {
for (int j=0; j<2; j++) {
result[i] += matrix[i][j] * vector[j];
}
}
}
```

Figure 8A:
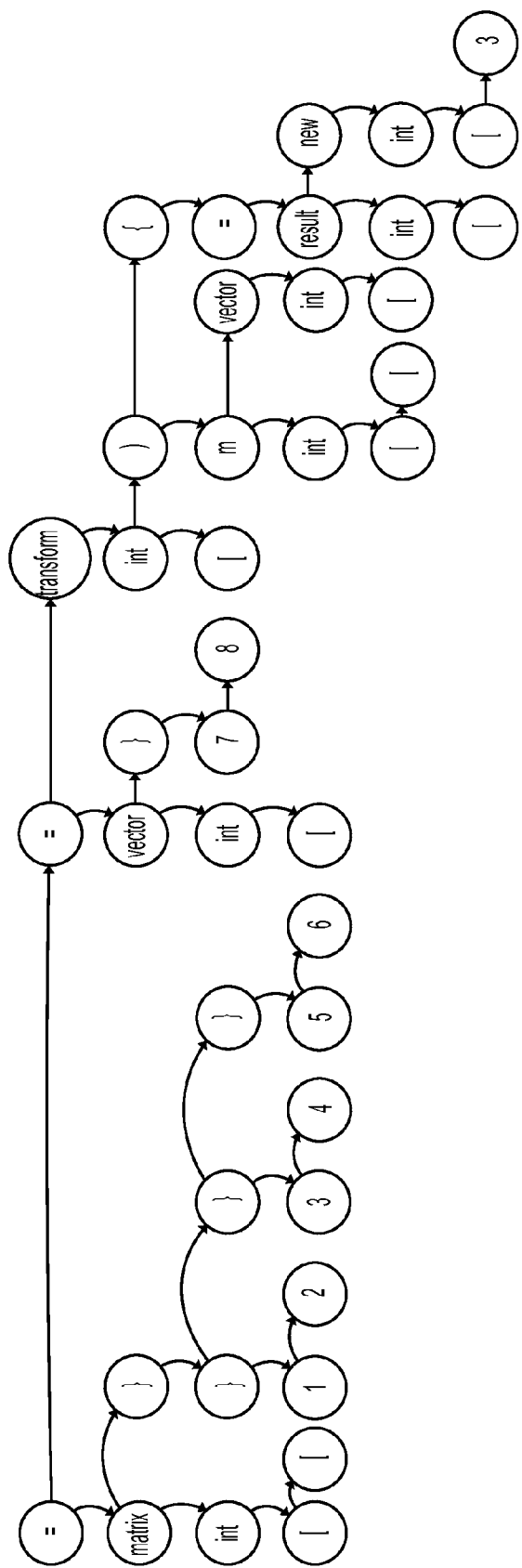
FIG. 8A is a diagram of an example program constructed as a whole-program graph.
Figure 8B:
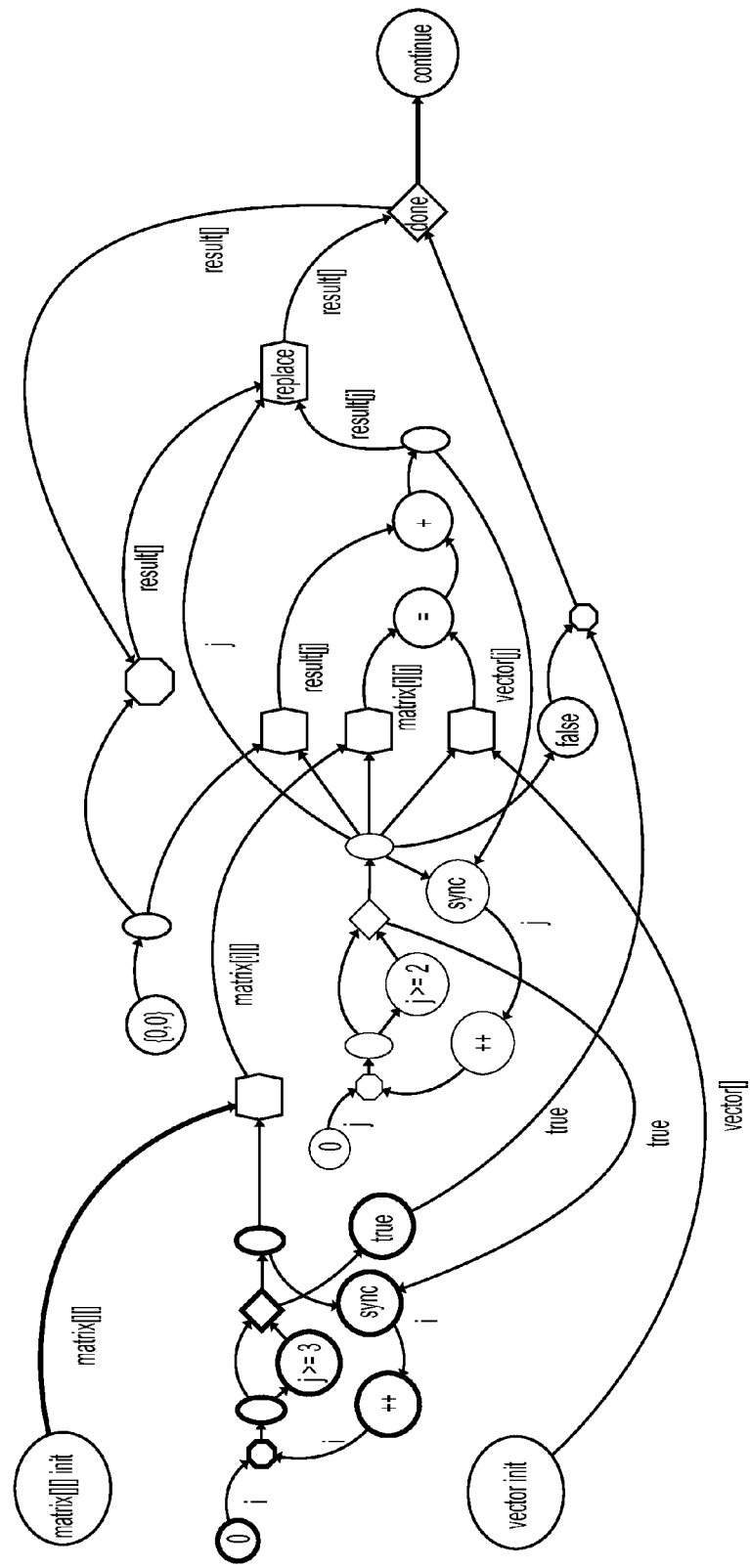
FIG. 8B is a second diagram of an example program constructed as a whole-program graph.
Figure 8C:
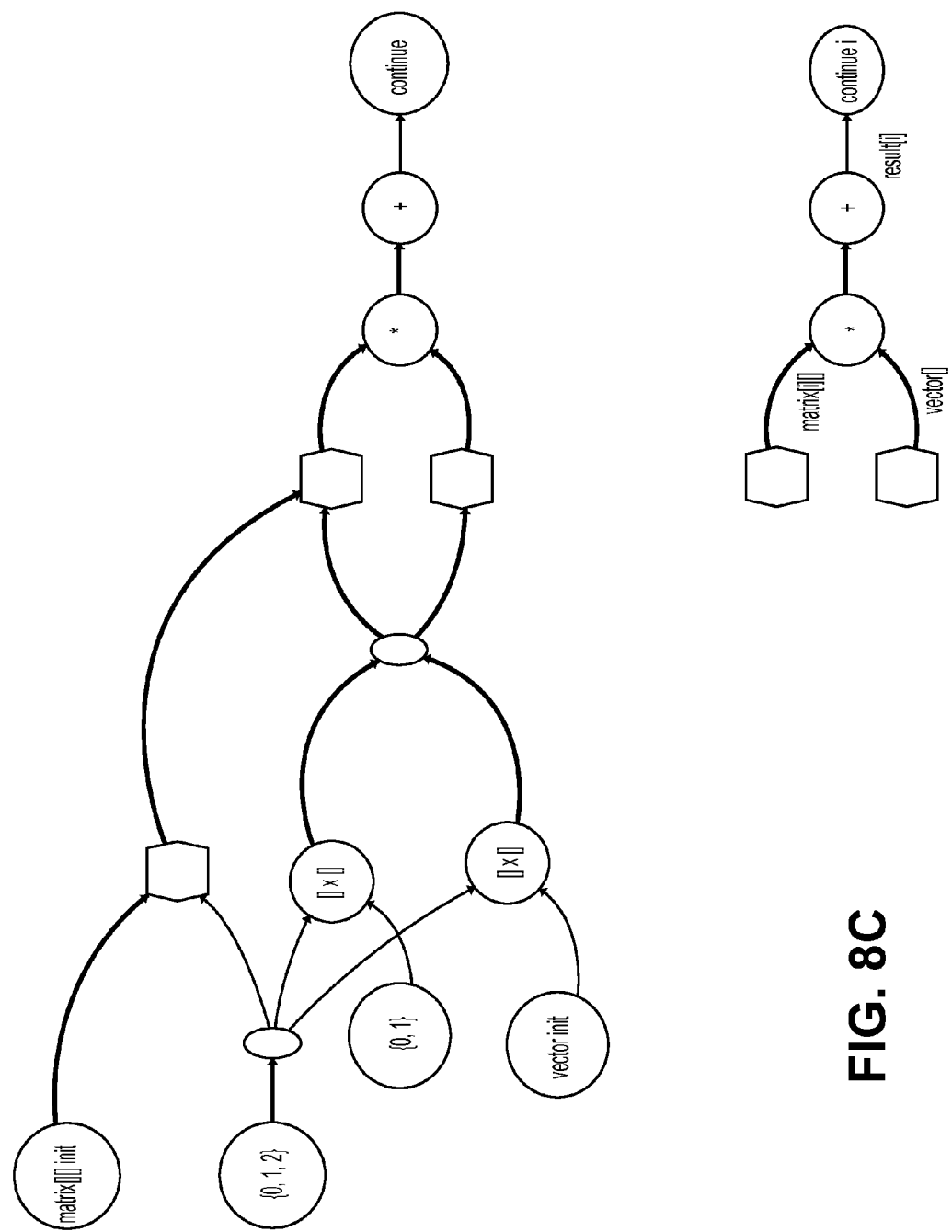
FIG. 8C is a third diagram of an example program constructed as a whole-program graph.

FIGS. 8A-C are diagrams illustrating the conversion process for a matrix-vector multiply. The Figures demonstration the conversion of the program above. These Figures include diagrams of the final set-oriented parallel form. FIG. 8A is a diagram illustrating the AST for the matrix-vector multiply program. FIG. 8B is a diagram illustrating the loop form of the functional dataflow for the matrix-vector multiply, with the loop logic highlighted. FIG. 8C is a diagram illustrating the set-oriented functional dataflow version of the matrix-vector multiple, with all parallelism extracted. Loops are, by definition, semantically equivalent to the unrolled form. This makes it necessary to add some form of synchronization to avoid bypassing some of the iterations. In FIG. 8B, this is implemented via the inserted "sync" function nodes. These nodes "gate" iterations so that the update logic (i++ or j++ in this example) of the for loop is only executed after all computations in the preceding iteration have been carried out. FIG. 8C has two elements: the full set version of the matrix-vector multiply, and a cutout of the central compute logic for matrix[i][ ]*vector[ ] to calculate result[i]. The full version includes cross-product nodes: these would not normally be inserted in a constructed graph, but are here to help clarify the set logic. The + node in the cutout sums a set (the sum over j of matrix[i][j]*vector[j]) to produce a single value; in parallel computing terms, it is a "collective" operation.

Figure 9:
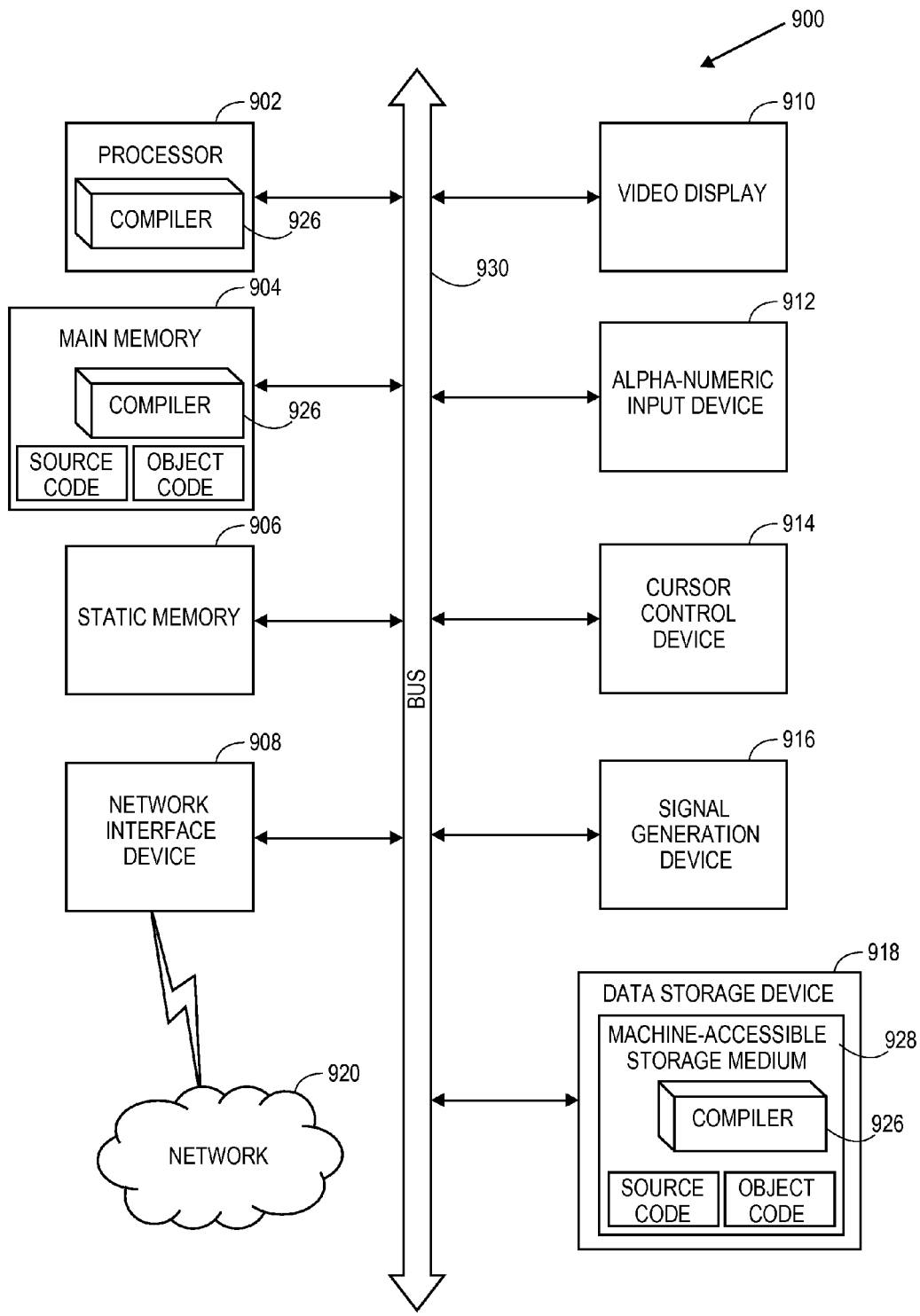
FIG. 9 is a diagram of one embodiment of a computer system implementing the compilation process.

FIG. 9 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus.

The processing device 902 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute a compiler 926 for performing the operations and steps discussed herein.

The computer system 900 may further include a network interface device 908. The computer system also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium 928 (or more specifically a non-transitory computer readable storage medium) on which is stored one or more sets of instructions (e.g., the compiler 926) embodying any one or more of the methodologies or functions described herein (e.g., the compiler 926). The compiler 926 (i.e., including the front-end, middle-end or linker and/or the back-end) may also reside, completely or at least partially, within the main memory 904 and/or within the processing device 902 during execution thereof by the computer system 900; the main memory 904 and the processing device also constituting machine-readable storage media. The compiler 928 may further be transmitted or received over a network via the network interface device 908.

The machine-readable storage medium 928, which may be a non-transitory computer readable storage medium, may also be used to store the compiler 926 module persistently. While the non-transitory computer readable storage medium is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 900 may additionally include the compiler 926 for implementing the functionalities of the compilation process described above. The module, components and other features described herein can be implemented as discrete hardware components or integrated in the functionality of hardware components such as ASICS, FPGAs, DSPs or similar devices. In addition, the module can be implemented as firmware or functional circuitry within hardware devices. Further, the module can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "determining," "setting," "converting," "constructing," "traversing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of program compilation to improve parallelism during the linking of the program by a compiler, the method comprising:
converting statements of the program to canonical form;
constructing a traversable representation for each procedure in the program; and
traversing the program to construct a functional dataflow graph, in which an assignment statement or function call is represented as a node, a control flow decision is represented by a first set of nodes, an array or set is represented as a second set of nodes, and edges of the functional dataflow graph represent typed data;
identifying at least one loop in the functional dataflow graph that can be executed in parallel; and
transforming the at least one loop to a set operation by retyping connections between nodes of the functional dataflow graph.

2. The method of claim 1, further comprising:
identifying a recursive procedure; and
expanding the recursive procedure to provide nodes for each recursion in the traversable representation of the recursive procedure.

3. The method of claim 1, further comprising:
identifying indirect procedure calls; and
converting the indirect procedure calls to switch structures in the traversable representation.

4. The method of claim 1, wherein traversing further comprises:
expanding procedures found in the traversable representation of a primary procedure of the program to incorporate a traversable representation representing each secondary procedure of the program.

5. The method of claim 1, further comprising:
creating a table of initial values for global variables.

6. The method of claim 1, further comprising:
creating nodes representing initial global variable values; and
adding the nodes representing the initial global variable values as input nodes for the traversable representation.

7. The method of claim 1, further comprising:
creating a global procedures table to reference each procedure and associated traversable representation for the program.

8. The method of claim 1, wherein constructing the traversable representation comprises:
parsing code of the program to identify control structures that govern alternative statements; and
converting each control structure into a sub-graph with conditioning function and with alternative statements represented as separate paths in the graph that later merge and loop.

9. The method of claim 8, further comprising:
linking the sub-graph structure to the functional dataflow graph by linking input and output interfaces of the sub-graph structure to surrounding nodes of the functional dataflow graph.

10. The method of claim 1, further comprising:
outputting the functional dataflow graph of the program to a compiler to guide parallelized compilation of the program.

11. The method of claim 1, wherein the traversable representation is an abstract syntax tree.

12. A non-transitory machine-readable medium having instructions stored thereon, which when executed by a computer system, execute a method of program compilation to improve parallelism during the linking of the program by a compiler, the method comprising:
converting statements of the program to canonical form;
constructing a traversable representation for each procedure in the program; and
traversing the program to construct functional dataflow graph, in which an assignment statement or function call is represented as a node, a control flow decision is represented by a first set of nodes, an array or set is represented as a second set of nodes, and edges of the functional dataflow graph represent typed data;
identifying at least one loop in the functional dataflow graph that can be executed in parallel; and
transforming the at least one loop to a set operation by retyping connections between nodes of the functional dataflow graph.

13. The non-transitory machine-readable medium of claim 12, further comprising:
identifying a recursive procedure; and
expanding the recursive procedure to provide nodes for each recursion in the traversable representation of the recursive procedure.

14. The non-transitory machine-readable medium of claim 12, further comprising:
identifying indirect procedure calls; and
converting the indirect procedure calls to switch structures in the traversable representation.

15. The non-transitory machine-readable medium of claim 12, wherein traversing further comprises:
expanding procedures found in the traversable representation of a primary procedure of the program to incorporate a traversable representation representing each secondary procedure of the program.

16. The non-transitory machine-readable medium of claim 12, further comprising:
creating a table of initial values for global variables.

17. The non-transitory machine-readable non-transitory of claim 12, further including instructions, when executed perform the method further comprising:
creating nodes representing initial global variable values; and
adding the nodes representing the initial global variable values as input nodes for the traversable representation.

18. The non-transitory machine-readable medium of claim 12, further comprising:
   creating a global procedures table to reference each procedure and associated traversable representation for the program.

19. The non-transitory machine-readable medium of claim 12, wherein constructing the traversable representation comprises:
   parsing code of the program to identify control structures that govern alternative statements; and
   converting each control structure into a sub-graph with conditioning function and with alternative statements represented as separate paths in the graph that later merge and loop.

20. The non-transitory machine-readable medium of claim 19, further comprising:
   linking the sub-graph structure to the functional dataflow graph by linking input and output interfaces of the sub-graph structure to surrounding nodes of the functional dataflow graph.

21. The non-transitory machine-readable medium of claim 12, further comprising:
   outputting the functional dataflow graph of the program to a compiler to guide parallelized compilation of the program.

22. The non-transitory machine-readable medium of claim 12, wherein the traversable representation is an abstract syntax tree.

\* \* \* \* \*

UNITED STATES PATENT AND TRADEMARK OFFICE
CERTIFICATE OF CORRECTION

PATENT NO. : 9,864,590 B2
APPLICATION NO. : 14/869823
DATED : January 9, 2018
INVENTOR(S) : Loring G. Craymer, III It is certified that error appears in the above-identified patent and that said Letters Patent is hereby corrected as shown below:

In the Claims

In Column 19, Line 29, delete the excessive "and"

In Column 20, Line 61, delete "The non-transitory machine-readable non-transitory" and insert -- The non-transitory machine-readable medium --

Signed and Sealed this
Fifth Day of May, 2020

Andrei Iancu
*Director of the United States Patent and Trademark Office*